Patented June 22, 1948

2,443,866

UNITED STATES PATENT OFFICE 2,443,866

METHOD OF TREATING APPLES

Harry A. Noyes, Watertown, Mass.

No Drawing. Application September 3, 1943, Serial No. 501,141

5 Claims. (Cl. 99—193)

1

The present invention relates to apples preserved for use at more or less prolonged intervals subsequent to harvesting and to methods of preserving and preparing fresh apples for future use.

Its objects are to preserve peeled apples, and parts thereof, so that the bouquet and flavor of the apples after prolonged storage will be superior to those resulting from the hitherto known procedures; to preserve and treat such apples, and parts thereof, so that they will retain the flavors required for pies and other articles of food containing apples, without need of adding flavoring materials when the apples and food articles containing apples are cooked; to provide material for the production of apple pies of distinctive and superior qualities; to treat the peeled apples, and parts thereof, prior to preservative freezing in such a manner that their liquid contents will be retained without appreciable diminution during prolonged storage and after defrosting; and to obtain the results related to the foregoing which are set forth in the specification.

It is known that freshly cut surfaces of apples darken rapidly when exposed to air. It is also known that cut pieces of apples and peeled apples, when frozen for preservation, may lose part of their juices in the course of the freezing actions. It is also known that treatment subsequent to freezing frequently cause disintegration of fruit much more rapidly and in much greater quantity than is desirable, wherefore cooked products which contain apples, such as pies, for example, contain an excess of liquid and the apple pieces are unduly depleted of liquid. Procedures have been developed heretofore to check or prevent discoloration of freshly cut apples, to freeze slices of apples as a means of preserving them, and to subject frozen apple pieces to conditioning treatments. However, these procedures are capable of being, and frequently are, so applied that the resulting products are of mediocre or inferior quality. To illustrate, heat application and the use of sulphur dioxide cause undesirable results when used in the preparation of apple slices; "cold pack" methods of freezing, in which the fruit pieces are packed in sugar and then frozen, cause constituents from the fruit to be extracted before the surfaces of the pieces have solidified, and cause the structure of the fruit itself to be altered; and the usual mode of defrosting such frozen fruit and mixing with extracted juices, change the bouquet and other natural characteristics of the fruit.

This invention is the result of my discovery of how to control the necessary and desirable procedures of freezing and conditioning so that a product is obtained in a form that can be handled, when defrosted after freezing, just as freshly cut apple slices can be.

Apples of different varieties differ from each other in one or more of the characteristics of structure, shape, size, color, contents of juice, and proportional contents of acids, sugar and other flavoring matter in the juice. Apples which have been retained in cold storage for long periods, i. e., several months and then exposed to air, oxidize and darken more quickly and more deeply than apples freshly harvested at the same stage of ripeness. I realize that respiration varies with light and temperature conditions and that gases are more soluble in the juices of apples at low than at high temperatures as a general rule.

I have discovered that frozen apple slices of high quality may be obtained by spraying fresh slices, after treatment to prevent discoloration, with a large volume of refrigerated sugar solution at a temperature lower than 17° F., of which the sugar concentration is such that the freezing point of the solution is less than two degrees lower than the temperature at which it is employed for freezing, and of which the viscosity is less than 65 centipoises at the temperature used.

I have discovered further that sodium chloride and fruit acids may be employed with sugar in making up my freezing solution. I recognize also that apple constituents are always present to some extent in freezing solutions which have been flowed one or more times over the apple slices. Both sodium chloride and fruit acids lower the freezing point of freezing solutions to the extent that they add units (molecules or ions) to the solution; except in cases where double compounds of sugar and salt are formed, due to specific concentrations of the substances present in certain solutions.

I have discovered further that I can add substances to apple slices after freezing so as to increase the jellation, contents of solids, flavors and bouquets. New flavoring and seasoning may be accomplished while the apple pieces are in the frozen state, and colloids and jellying substances may be added at that time.

I have also discovered that the conditions necessary for gel formation are markedly different if heat is kept at a minimum, specifically, at temperatures lower than those which cause cooking, preferably not above moderate atmospheric temperatures.

The invention comprises new combinations of steps of preparing, freezing and conditioning apple slices, the products resulting from the treatment of apple slices by such procedure or combinatons, and prepared food articles made with the use of such prepared apple slices.

In this specification, the word "prepare," and derivatives of that word, signify the procedures followed up to the commencement of the freezing step. "Freeze" and other forms of that word signify the changing of the liquid portion of prepared apple pieces to the stabilized solid state accomplished by extraction of heat. "Condition" and "conditioning" include all the treatments performed after freezing and while the fruit is frozen, and also those occurring during defrosting and up to the placement of the fruit in the food article in which it is used. "Slice" signifies any cut portion of an apple, whatever may be the form and dimensions of such piece.

By way of further explanation of the invention, I will give some illustrative examples of each of the steps of preparation, freezing and conditioning.

*Example No. 1 of preparation.*—Fresh apples, within a few days after picking, and without having been either placed in cold storage or heated, are cleaned without being heated, peeled, and immediately immersed in a sodium chloride solution in which the content of salt is in the order of 3 to 5%, at room temperature. This solution may, if desired, contain a suitable quantity of soluble fruit acid. It excludes air from the surfaces of the peeled apples, thus preventing discoloration. Apples are then passed through a slicing machine and the slices immediately dropped into a similar or identical solution, which also is maintained at approximately normal room temperature or within a few degrees of that temperature. After a short period of time, sufficient to cause curing of the surfaces of the slices so that they will not darken when subsequently exposed to the air, the slices are removed from the solution, drained, and passed on to the freezing step.

*Example No. 2 of preparation.*—Apple slices cut and immersed in sodium chloride solution, as described in Example No. 1, are accumulated in the vat or tank of brine until sufficient in quantity for economical treatment in a vacuum apparatus. The slices are then taken from the receiving tank and loosely packed in the receptacle of the vacuum apparatus, then covered with a sodium chloride solution which is preferably slightly stronger than that above described; although not necessarily so. The apples and solution are then subjected to a limited degree of vacuum, not over 24 inches of mercury, for approximately 15 minutes. The specific values of vacuum and time here given are not limiting, for with certain varieties and conditions of apples, the vacuum may be lower or the time may be shorter. When a vacuum of 24 inches, or nearly as high a vacuum is employed, the time period is preferably somewhat shorter than 15 minutes. The object of the vacuum is to extract gases from the apple pieces. The vacuum is limited to a maximum of 24 inches of mercury in order that substances will be retained which would be lost if a higher vacuum were applied to apple pieces under temperatures above ordinary summer heat. The vacuum is then released and the material exposed to atmospheric pressure, whereby the solution is caused to fill the voids at and near the surfaces of the slices. The apples are retained in the brine then for several minutes at least, sufficient to produce the desired filling of the voids, after which they may be removed, drained, and passed on to the freezing step.

In some cases, as where the apples have been held at temperatures near their freezing points up to the time of subjection to the vacuum treatment, the atmospheric pressure is not sufficient to produce the equilibrium condition within the desirably short time; and in such cases, a positive pressure up to about 50 pounds above atmospheric is applied to the solution covering the apples. It is necessary to apply the pressure in such a way that air is not forced directly against the surface of the pieces.

*Example No. 3 of preparation.*—The apples which have been held in cold storage, without being peeled or cut, at a temperature near their freezing point for considerable periods, are peeled, sliced and immerse in brine, substantially as in Example No. 1. They are then allowed to warm up to the room temperature, which may be thirty or forty degrees warmer than the storage temperature. This treatment causes gases which have been absorbed by respiration of the apples at low temperatures to be driven off, and enables the curing procedure and substitution of the salt solution to take place without subjection to vacuum.

The freezing step

This step is most advantageously carried out by the best methods available of quick freezing. The following examples will illustrate the preferred mode of carrying out this step.

*Freezing Example No. 1.*—The apple slices prepared according to any of the preceding examples are distributed on a perforated surface and arranged so that the depth of the accumulation of pieces is not greater than approximately the diameter of the whole apples from which they were prepared. These pieces are sprayed with a copious spray of free flowing refrigerated sugar solution applied in larger volume per surface area of the pieces than is necessary to freeze the surfaces of such pieces quickly and hold them continuously in the frozen condition until the pieces are frozen throughout. The solution is prepared according to known principles to have a freezing point at least as low as 15° F., and possibly somewhat lower. In use, it is chilled to a temperature at least as low as 17° F. and to within approximately two degrees of its freezing point, and its viscosity is not over 65 centipoises at the temperature at which it is supplied. The slices are subjected to this solution for a time long enough to freeze them throughout. They are then packed in containers while carrying a film of the solution on their exteriors.

*Freezing Example No. 2.*—Slices prepared according to any of the precedently named preparing steps are placed in foraminous containers and subjected to a strong blast of air at a sufficiently low temperature to cause freezing of the surfaces of the apple slices before dehydration has occurred.

Both modes of freezing described in the foregoing examples of the freezing step are alike in that they cause the slices to be frozen with little or no loss of moisture. The outer surfaces of the slices and layers of cells nearest to the surfaces are frozen almost instantly on subjection to the spray of refrigerant solution or the blast of cold air, respectively; and the impervious shells made by the frozen substance then seal in the liquid contents of the slices so that loss by osmosis or evaporation during the subsequent progress of freezing to the centers of the slices is prevented.

In Example 1, in which the refrigerant solution is applied at a temperature less than 2° F. higher than its freezing point, the solution is diluted by the film of liquid adhering to the slices to a concentration at the interface with the slices such that its freezing point there is higher than the temperature of the solution, wherefore a shell of ice is formed instantly encasing the slices.

*Conditioning of the frozen product*

Apple slices frozen by either of the above-mentioned freezing steps, or their equivalents, are immersed in a solution containing any substance which it is desired to add, as sugar, spices, other flavoring substance or jellying substance, or any two or more of such substances, and maintained in cold storage at a temperature below the freezing point of the slices. With lapse of time, the substances contained in such solution are absorbed into the apple slices. During this conditioning treatment, any of the flavoring substances which would be used along with apples in apple pies, cakes or any other food articles made with apples, may be incorporated into the frozen pieces. During some portion of the storage period, the temperature, while being lower than the freezing point of the apple pieces, is kept at some degree higher than the freezing point of the solution, to enable the passage of solution into the apple substance.

The apple pieces thus prepared, frozen and treated retain their integrity and can be readily separated from one another in any numbers and quantities. When defrosted, they maintain their cohesion and form and do not exude the usual quantity of liquid. They may, however, be used without defrosting for making pies, etc. For example, in regular procedure, the frozen apple pieces are taken out of cold storage and, without defrosting, are placed directly on the piecrust on the bottom of a cooking pan, and thereafter the pie is completed and baked. With apples which have been subjected to the full conditioning treatment, no other flavoring or sweetening need be placed in the pie.

A specific example of the complete procedure of preparation, freezing and conditioning is given as follows, by way of illustration and without intent to indicate limitations in the scope of the invention.

Fresh ripe apples are peeled and immediately dropped into a solution of brine; then they are cored, seeded, sliced, and the slices immediately immersed in the same or a similar brine solution. A sufficient quantity of slices for effective commercial treatment is then placed in a container, covered with brine (which may contain from 5 to 8% of sodium chloride) and the container subjected to vacuum of not over 24 inches of mercury for a period of about 15 minutes. The vacuum is released then and the container and its contents of brine and fruit slices subjected to air pressure up to not over 50 pounds per square inch for a period in the order of 15 minutes. The prepared apple pieces are then drained and loosely placed in trays to any desired depth, preferably not exceeding 3 inches, and sprayed with a refrigerated solution of sugar containing soluble extracts of apples in water; the solution being chilled to a temperature of not over approximately 17° F. and having a freezing point of not more than two degrees below the temperature to which it is chilled, and a viscosity of not over 65 centipoises at the temperature of use, and being applied in a large enough volume to cause quick freezing of the surfaces of the slices and to maintain such surfaces in the frozen condition until the pieces are frozen throughout. The frozen pieces are then drained of excess freezing solution, packed in containers and placed in cold storage where the temperature is maintained below the freezing temperature of the apple pieces. This temperature may be maintained above the freezing point of the solution throughout the period of storage or it may be lower than that freezing point during part of such period, provided that at some stage of the storage period, the solution is allowed to become or remain liquid, at least in part, by causing its temperature to be above the eutectic temperature of at least one substance in solution for long enough time to permit the absorption of its constituents into the substance of the frozen apple slices. Other flavoring and treating substances, such as nutmeg, cinnamon, or other spices, starch, etc., may be applied to the frozen pieces at any time during storage or at the time of removal from the storage warehouse for shipment to the consumer. In this way, sufficient sugar and flavoring may be combined with the apple substance to satisfy the flavoring requirements of apple pies and other articles of food containing apples. The apple pieces, without defrosting, are placed in piecrust and baked with the crust. Pies so made have superior apple characteristics.

Variations of the procedure last described are within the scope of the invention, and include the following:

*Variation 1.*—The apple pieces, prepared as described, are frozen by application of a copious spray of sodium chloride solution containing apple constituents, and in which the content of sodium chloride predominates; the solution being applied at a temperature not over 10° F. and having such concentration of soluble solids that its freezing point is within 2° F. of the temperature at which it is used, and being sprayed in volume great enough to freeze the surfaces of the apple pieces almost immediately and maintain them in the frozen state until frozen throughout. The frozen pieces are then drained of the excess freezing solution and covered with a film of water solution in which the dissolved matter is principally sugar, which is applied at a temperature below the freezing point of the apple pieces. The sugar in this treating solution displaces and is substituted for a part of the salt in the salt solution; such substitution eliminating all but enough salt to give a desired flavor. The sugar solution is preferably applied in considerable bulk so as to wash off the film of salt solution to the extent indicated. Subsequent storage and use of the pieces so treated are or may be the same as in the foregoing example.

*Variation 2.*—The apples are prepared in the manner described under the title "Example No. 1 of preparation," and are then frozen and treated as described in the foregoing "specific example."

*Variation 3.*—The apples are prepared as described under the title "Example No. 2 of preparation," and then frozen and treated as set forth in the preceding "specific example."

*Variation 4.*—The apples are prepared as described under the title "Example No. 3 of preparation," and are frozen and conditioned as described in the foregoing "specific example."

Other variations comprise combinations of any of the examples of preparation with the foregoing "Variation 1," and with the step of freezing according to "Freezing Example No. 2," and conditioning in accordance either with the "specific example" or "Variation 1."

It is to be noted that the procedure hereinbefore described does not involve any cooking step or heating of the apples or parts thereof at any time to a temperature higher than the room temperature where the steps of preparation are performed. The character of the freezing step is such that no appreciable dehydration or loss of moisture from the apples by osmotic action occurs. Consequently, the finished apple pieces contain essentially the same amount of juice and moisture, whether in the solid state while frozen or in the liquid state after defrosting, as the original apple substance at the time of cutting. In addition, the pieces contain water and salt substituted for gases originally present in the apple substance, and a large relative content of sugar, exceeding the normal sugar content of ripe apples, together with such amounts of spices or other flavoring materials as have been absorbed during the prolonged retention in frozen storage and which may adhere to the surfaces of the pieces.

Sugar solutions having the properties specified in the foregoing specification with respect to the freezing solution there described, are obtainable in accordance with the principles and specification described in my prior applications for patent and more particularly my application Serial No. 304,954, filed November 17, 1939, now abandoned but continued in part in application Serial No. 482,611, filed April 10, 1943.

What I claim and desire to secure by Letters Patent is:

1. The method of preserving prepared pieces of raw apples to retain virtually all their natural color, bouquet, and flavor constituents comprising immersing freshly prepared apple pieces, before their cut surfaces have darkened, in a brine solution maintained at room temperatures; subjecting such pieces and the enveloping body of brine to a vacuum of not over approximately twenty-four inches of mercury for not over fifteen minutes approximately; relieving the vacuum and allowing the apple pieces to take up brine from the gas-exhausted solution enveloping them; removing the treated apple pieces from the brine; and then freezing them.

2. Steps in treating prepared pieces of raw fresh apples to retain virtually all their natural color, bouquet, and flavor constituents comprising immersing the prepared apple pieces, before their cut surfaces have appreciably darkened, in a brine solution maintained at room temperatures; subjecting such pieces and the enveloping body of brine to a vacuum of not over approximately twenty-four inches of mercury for a period of time not greater than approximately fifteen minutes; and relieving the vacuum whereby brine enters into the apple pieces to replace gaseous material that was withdrawn by the vacuum.

3. The method of treating raw apple pieces for the preservation thereof which consists of placing freshly cut apple pieces in brine before their freshly cut surfaces have become discolored, subjecting the pieces and the enveloping brine to a vacuum of not over approximately twenty-four inches of mercury for not longer than approximately fifteen minutes, relieving the vacuum so that brine is substituted inside the pieces for the displaced gases, removing the apple pieces from the brine solution, spraying them copiously until frozen with an aqueous refrigerant solution containing a content of soluble matter sufficient to lower its freezing point to a temperature at least as low as fifteen degrees Fahrenheit, maintaining the solution during the freezing procedure at a temperature lower than seventeen degrees Fahrenheit, and maintaining its concentration of soluble solids such that its freezing point is within two degrees Fahrenheit lower than the temperature at which it is used and its viscosity at that temperature is not over approximately sixty-five centipoises.

4. The method of preserving prepared pieces of raw apples so as to retain virtually all their natural color, bouquet and flavor constituents comprising immersing the prepared apple pieces, before their freshly cut surfaces have darkened, in a brine solution maintained at room temperatures; subjecting such pieces and the enveloping body of brine to a vacuum of not over approximately twenty-four inches of mercury for not over fifteen minutes approximately; relieving the vacuum and allowing the immersed apple pieces to take up brine from the gas-exhausted solution enveloping them to replace the exhausted gases; removing the treated apple pieces from the brine; quick freezing the pieces by spraying over them a refrigerated circulating aqueous solution containing principally salt in a concentration sufficient to maintain the solution liquid at a temperature lower than ten degrees Fahrenheit; the temperature of the sprayed solution being maintained less than two degrees Fahrenheit higher than its freezing point; draining from the frozen pieces, while at a temperature below their freezing point, so much of the salt solution as will separate from them in a few minutes time and covering the drained surfaces of the frozen pieces with an aqueous solution where the material present is mainly sugar.

5. The method of preserving prepared pieces of raw apples to retain virtually all their natural color, bouquet and flavor constituents, which comprises immersing freshly prepared apple pieces, before their surfaces have darkened, in a brine solution maintained at room temperatures; subjecting such pieces and the enveloping body of brine to a vacuum of not over approximately twenty-four inches of mercury for not more than approximately fifteen minutes; relieving the vacuum and allowing the apple pieces to take up brine from the solution enveloping them; removing the treated apple pieces from the brine and subjecting them to a strong blast of cold air of which the temperature is low enough to cause freezing of the surface of the apple pieces before appreciable dehydration has occurred, for a length of time sufficient to cause the pieces to become frozen.

HARRY A. NOYES.

REFERENCES CITED

The following references are of record in the file of this patent:

UNITED STATES PATENTS

| Number | Name | Date |
|---|---|---|
| 1,877,587 | Rasche | Sept. 13, 1932 |
| 2,004,354 | Tierney | June 11, 1935 |
| 2,164,362 | Taylor | July 4, 1939 |
| 2,286,225 | Noyes | June 16, 1942 |
| 2,317,397 | Noyes | Apr. 27, 1943 |

OTHER REFERENCES

Tressler et al.: "Fruit and Vegetable Juices," Avi. Pub. Co., N. Y. C., 1939, page 371.